United States Patent [19]

Hansen et al.

[11] 4,248,326

[45] Feb. 3, 1981

[54] PORTABLE, BOARD-GRIPPING PLATFORM SUPPORT

[75] Inventors: W. Robert Hansen; George C. Christensen, both of Friday Harbor, Wash.

[73] Assignee: Porta Horse, Inc., Friday Harbor, Wash.

[21] Appl. No.: 929,799

[22] Filed: Jul. 31, 1978

[51] Int. Cl.³ .............................................. F16M 11/00

[52] U.S. Cl. .................................... 182/185; 182/186; 182/226

[58] Field of Search ............... 182/186, 226, 119, 118, 182/185, 182; 248/150, 165, 295 C, 410, 246

[56] References Cited

U.S. PATENT DOCUMENTS

| | | | |
|---|---|---|---|
| 2,400,659 | 5/1946 | St. Mars | 182/119 |
| 2,416,950 | 3/1947 | Pohrman | 182/186 |
| 2,634,942 | 4/1953 | Hughes | 248/295 C |
| 3,212,606 | 10/1965 | Spaw | 182/185 |
| 3,809,183 | 5/1974 | Lowd | 182/186 |
| 4,008,786 | 2/1977 | Canavan | 182/186 |

*Primary Examiner*—Reinaldo P. Machado
*Attorney, Agent, or Firm*—Christensen, O'Connor, Johnson & Kindness

[57] ABSTRACT

A portable, lightweight, board-gripping support for a conventional board includes four rectangular, tubular pieces. The four pieces are configured and connected to form generally an A-shape in a single plane. Bar members form the upper and lower cross members of the A-shaped support. Opposing surfaces of the bar members are substantially planar, oriented orthogonal to the plane of the A-shaped support, and spaced apart by a distance greater than the thickness of the board such that the support forms an obtuse angle $\beta$ with the board when the edges of the opposing surfaces of the bar members contact the board. The angle $\beta$ is between 102° and 140°. When the board spans a pair of supports, and a downward loading force is applied to the board, the edges of the bar members create indentations in the board which resist relative sliding movement between the board and the support.

5 Claims, 6 Drawing Figures

PORTABLE, BOARD-GRIPPING PLATFORM SUPPORT

BACKGROUND OF THE INVENTION

This invention relates to a support adapted to support one end of a board, and more specifically to a portable, collapsible support for use in making temporary carpenters' sawhorses, scaffolding and other platforms used in the construction industry.

Conventional trestle structures, typically known as carpenters' sawhorses, have been used in the construction industry not only as a sawhorse but for supporting other structures such as scaffolding and staging. However, the conventional carpenters' sawhorses are bulky, and heavy, and therefore difficult and inconvenient to transport to and from, and store at a construction site. Moreover, the conventional sawhorses are somewhat complex in their structure and costly to manufacture.

Because of the above disadvantages with the conventional sawhorses, tradesmen in the construction industry typically form A-shaped members at the construction site, which, when used in pairs, support a plank-like board or platform. These handmade supports are usually not reusable, and waste valuable construction time and material.

Numerous portable supports have been suggested in the prior art to meet the need for a prefabricated, portable platform support. However, the apparatus disclosed in the prior art is bulky such that a plurality of supports cannot be compactly stacked for shipping, transport or storage. Moreover, many of the portable prior art supports include a complexly designed combination of numerous components which are expensive to manufacture.

Some prior art portable supports are generally A-shaped and provide an opening or socket for receiving a board to be supported. The opening is sized to be substantially equal to the cross-sectional dimensions of the board. The opening formed in this manner prevents use of the supports with boards having different cross-sectional dimensions; requires that the supports be manufactured within fine tolerances, which increases the cost of manufacture; and, makes it difficult and time-consuming for one person to assemble a horse because the board must be first precisely aligned orthogonal with the opening of the support before it can be fitted through the opening.

In using portable supports to form a horse, some provision must be made to avoid relative sliding movement between the board and the support. This relative sliding movement can result in the collapse of the horse. To resist relative sliding movement, the prior art portable supports either depend upon the coefficient of friction of contacting surfaces of the board and the support, upon a portion of the support abutting against preformed notches in a specially prepared board, or upon a set screw or mechanical locking mechanism which attempts to hold the position of the board in the support. However, resistance against the relative sliding movement for most of these prior art supports does not substantially increase as a downwardly applied force on the board is increased.

In view of the above, it is an object of this invention to provide a new and improved prefabricated, portable support which may be readily reused, and, when not in use, compactly stacked with a plurality of supports for transporting between job sites and storage at the job sites.

It is a further object of this invention to provide a portable, prefabricated support that has few components, is simple in design, relatively inexpensive to manufacture and is readily assemblable and disassemblable.

It is a further object of this invention to provide a new and improved prefabricated portable support which, when used in pairs, braces a plank or board; and which prevents relative sliding motion between the board and the support by substantially increasing the resistance against the relative sliding motion as a downwardly applied force exerted on the board is increased.

SUMMARY

In the present invention, a support braces one end of a board having a width and a thickness, and comprises two legs and first and second bar members. Each leg member has a top and a bottom. The legs are spaced apart, outwardly symmetrical and arranged so as to form a plane wherein the leg members diverge away from each other from their tops by an angle $\alpha$. The angle $\alpha$ can range between 10° and 90°. The first bar member is rigidly connected to the tops of each leg member and includes substantially planar first and second surfaces. The first surface is oriented substantially orthogonal to the plane defined by the leg members and faces the bottom of each leg. The second surface forms a first edge with the first surface. The span between leg members at the first surface is greater than the width of the board. The second bar member is rigidly connected to and joins the leg members, and includes third and fourth substantially planar surfaces. The third surface is substantially parallel with, opposes and is spaced apart from the first surface of the first bar member. The fourth surface forms a second edge with the third surface. The spacing between the first and third surfaces is greater than the thickness of the board and is within a range of distances which allows the first and second edges to contact the board when the plane defined by the support forms an obtuse angle $\beta$ with the board. The angle $\beta$ may vary between 102° and 140°. When the board is placed between the first and third surfaces of the support and the angle $\beta$ is created, the first and second edges are capable of forming indentations in the board when a downwardly applied force is exerted thereon.

It will be appreciated from this brief summary that the hallmark of this invention is its simplicity. Only four members are required, and only four connections need be made to the manufacture of this support. The design of the support allows compact stacking of a plurality of supports to facilitate their transport to and from, and storage at, construction sites. Because the opening formed between the legs and bar members is larger than the cross-sectional dimensions of the board, assembly and disassembly of a horse, using a pair of supports and a board, may be readily performed by one individual. To assemble a horse one merely places the board through the opening in each support (precise alignment of the board with the opening is not required) and then rotates the support relative to the board until the first and second edges contact the board. The first and second edges grip the board when a downward force is applied thereto by making indentations in the board. This gripping action resists relative sliding movement between the board and the support; and, the force resisting the relative sliding movement substantially increases when the downwardly applied force to the board is increased because the edges will make increasingly larger indentations in the board.

In accordance with further aspects of this invention, the distance between the first and third surfaces is less than or equal to the span between the leg members at the first surface. This distance relationship ensures that the board will be oriented with its longer cross-sectional dimension transcending between the leg members, and yields greater stability in the horse once it is assembled.

BRIEF DESCRIPTION OF THE DRAWINGS

The foregoing objects and many of the attendant advantages of this invention will become more readily appreciated by reference to the following detailed description and accompanying drawings.

DETAILED DESCRIPTION

Figure 1:
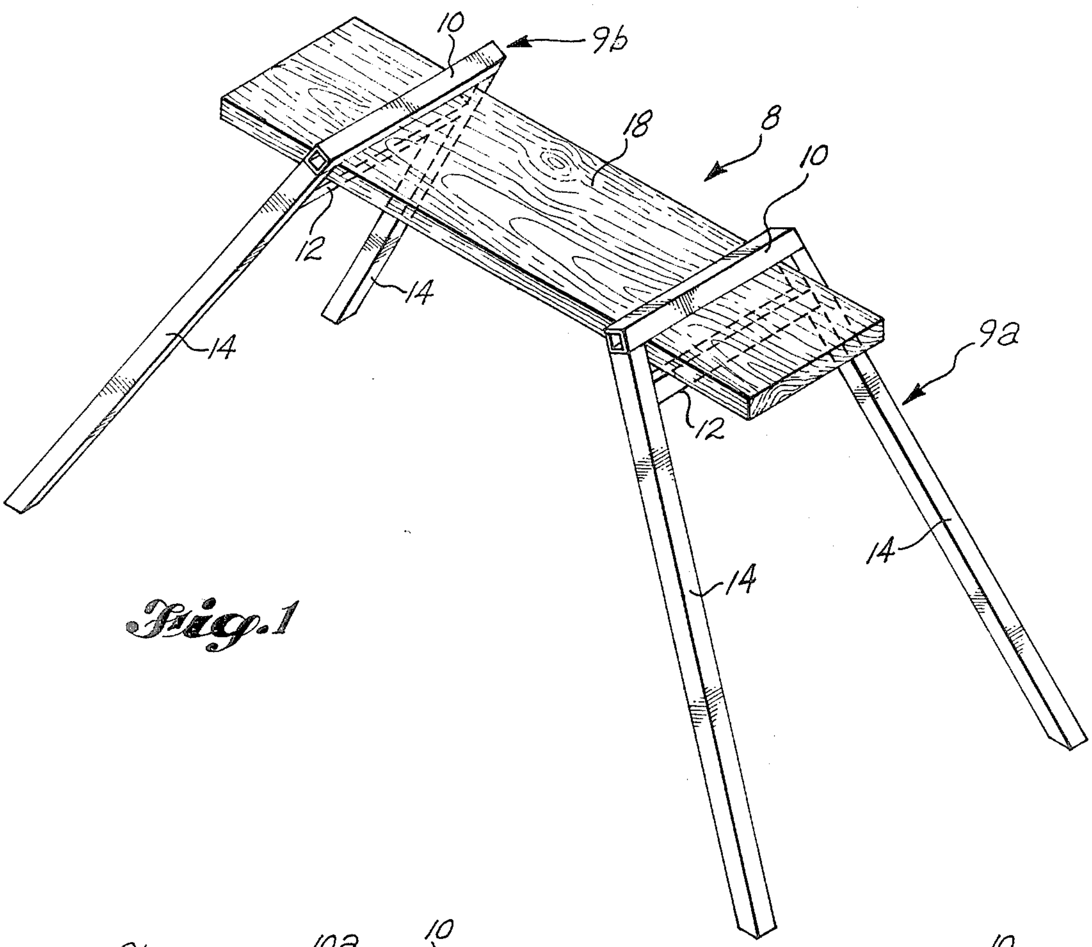
FIG. 1 is a perspective view of a horse which includes a board and a pair of supports formed in accordance with this invention.

In accordance with the present invention, a generally A-shaped support for holding one end of a board includes two leg members generally designated 14 and two bar members 10 and 12. The bar members 10 and 12 are connected to and join the two leg members 14. As shown in FIG. 1, a horse, generally designated by the numeral 8 includes a board 18 and first and second supports 9*a* and 9*b*. The board 18 spans and is braced by the two supports 9*a* and 9*b*. The board 18 is positioned on each support in an opening 15 formed between opposing surfaces of the two bar members 10 and 12 and the two leg members 14. The supports 9*a* and *b* are arranged to form mutually opposing obtuse angles with respect to the board 18 so that the opposing surfaces of bars 10 and 12 contact the corresponding upper and lower surfaces of the board 18 and prevent relative sliding movement between the board and the support.

Figure 2:
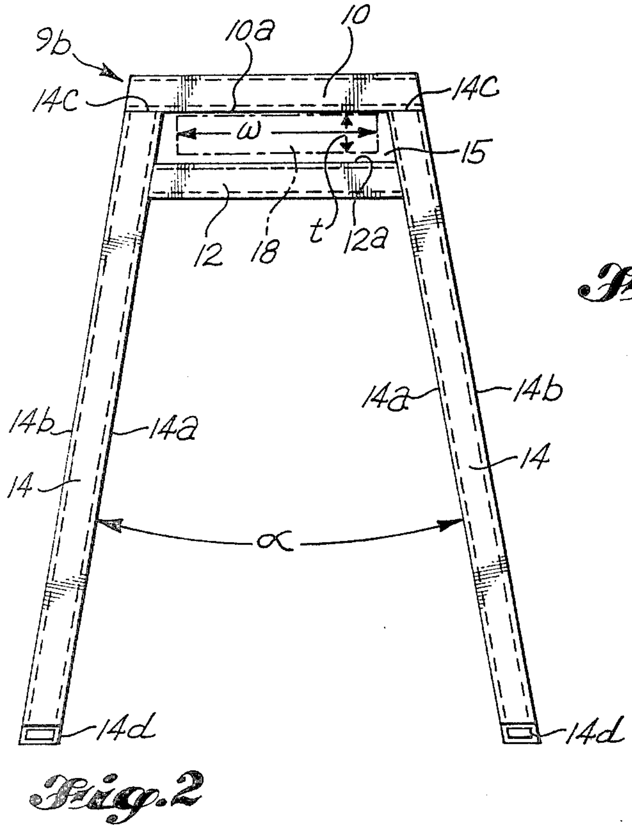
FIG. 2 is a front elevation view of a support formed in accordance with this invention.
Figure 3:
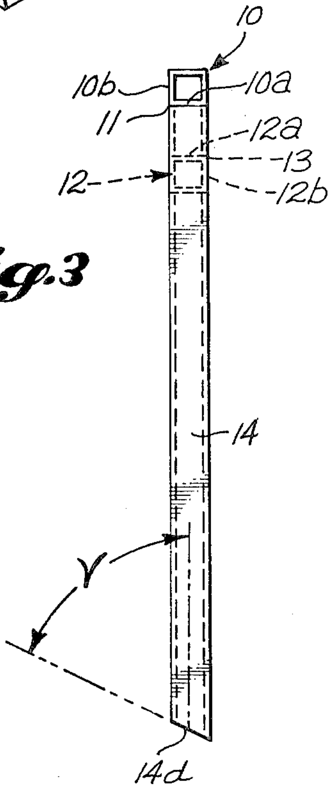
FIG. 3 is a side elevation view of a support formed in accordance with this invention.
Figure 4:
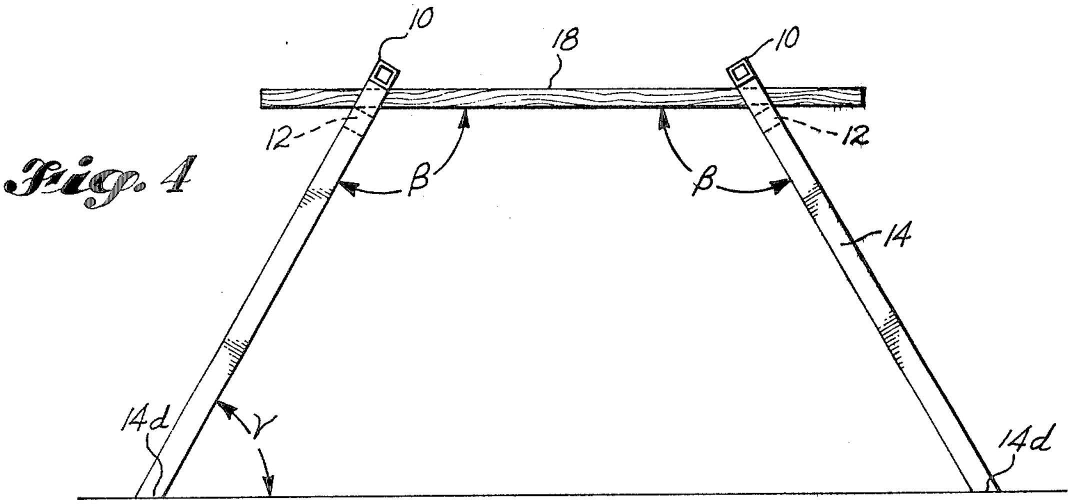
FIG. 4 is a front view of the horse shown in FIG. 1.

Referring now to FIG. 2, the A-shaped support 9*b* includes two elongate, straight, spaced-apart, symmetrical leg members 14, each having an inner surface 14*a*, an outer surface 14*b*, a top surface 14*c* and a bottom surface 14*d*. Leg members 14 are arranged so as to form a plane wherein the leg members 14 diverge away from each other from their tops 14*c* by an angle $\alpha$. The top surface 14*c* of each leg member is orthogonal to the plane formed by the two leg members. As illustrated in FIG. 4, the bottom surface 14*d* is planar and parallel with the bottom surface of board 18 when the board 18 is placed within opening 15 and sloped to form an obtuse angle $\beta$ with the plane of the support. Thus, the bottom 14*d* is beveled to form an acute angle $\gamma$ with the plane defined by the two leg members. See FIG. 3. Angle $\gamma$ is the supplement of angle $\beta$. Additionally, mutually opposing points on the bottom surface 14*d* between the inner and outer surfaces 14*a* and 14*b* form a line orthogonal to the plane defined by the leg members. See FIG. 2.

The first bar member 10 has a substantially planar first or lower surface 10*a*, which is welded to the top surface 14*c* of each leg member 14. The first surface 10*a* is orthogonal to the plane formed by the leg members. The ends of the first bar member 10 are shaped to be substantially planar with the outer surface 14*b* of each leg member 14. The span of the first surface 10*a*, between mutually opposing points on the inner surfaces 14*a* of the leg members 14 is greater than the width W of the board 18. An adjacent side or second surface 10*b* to first surface 10*a*, is planar and forms a first edge 11 with the first surface 10.

A second bar member 12 is positioned below the first bar member 10 and is configured and sized to be welded to mutually opposing sections of the inner surfaces 14*a* of each leg member 14. The upper or third surface 12*a* of the second bar 12 is substantially planar, mutually opposed to, parallel with, and spaced apart from the first surface 10*a* of the first bar member 10. An adjacent side or fourth surface 12*b* from the third surface 12*a* is planar and forms a second edge 13 with the third surface 12*a*. Second edge 13 is diagonally opposite the first edge 11.

Figure 5:
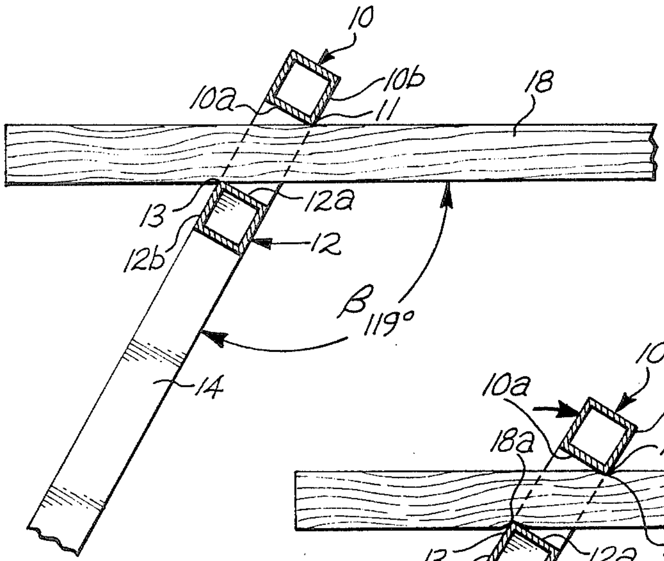
FIG. 5 is a partial, enlarged, cross-sectional view of the bar members of the support formed in accordance with this invention as they contact a board.

The spacing between the first surface 10*a* of the first bar member 10 and the third surface 12*a* of the second bar member 12, is greater than the thickness T of board 18 and is a predetermined distance. This predetermined distance may vary within a range of distances. The range of distances also varies depending upon the width of the first and third surfaces 10*a* and 12*a*, but can be most accurately described as a range of distances which allow the plane of the leg members to form an obtuse angle $\beta$ with the board 18 when the board is positioned within the opening 15 and edges 11 and 13 contact the upper and lower surfaces of the board respectively as illustrated in FIGS. 4 and 5.

Figure 6:
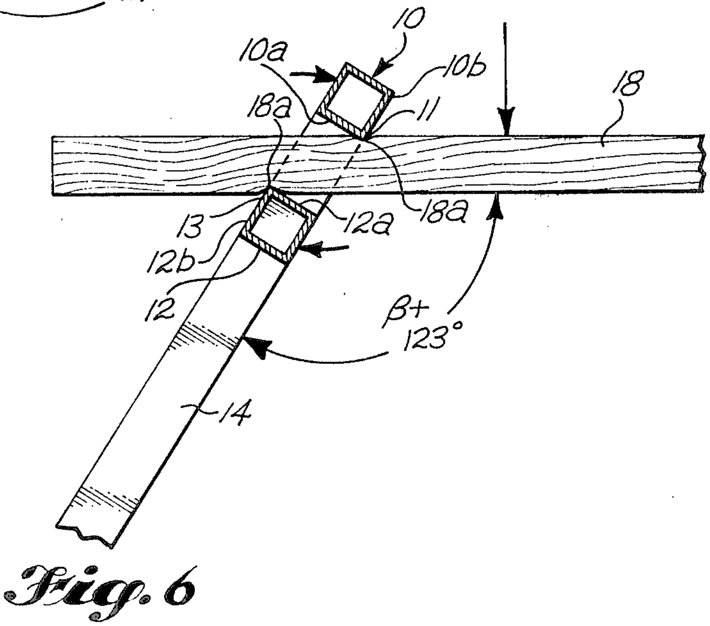
FIG. 6 is the cross-sectional view of FIG. 5 except that a downward force has been applied to the board.

Once a horse 8 is assembled as shown in FIG. 4, the first and second edges 11 and 13 contact the upper and lower surfaces of the board 18 and are capable of cutting into the board 18 to create indentations. See FIG. 5. Referring to FIG. 6, when a downward force is applied to the board 18, the indentations 18*a* are created in the upper and lower surface of the board 18 by the edges 11 and 13 and angle $\beta$ increases slightly to angle $\beta+$. As the downwardly applied force increases, the indentations 18*a* created by edges 11 and 13 also increase, which also substantially increases the resistance against relative sliding movement between the supports and the board 18. In essence, the edges 11 and 13 of the support grip the board 18 once the board is properly positioned in the support and the gripping force substantially increases with an increase of weight on the board.

In the preferred embodiment of this invention, the leg members 14 and the first and second bar members 10 and 12 are composed of square, tubular, thin-walled galvanized steel having an outer cross-sectional dimension of 1.5 inches. The opening of the support member is designed to accommodate a standard 2×12 board or any board having a thickness equal to 1.5 inches and a width less than 11.25 inches. Specifically, the distance between the inner surfaces 14*c* of the leg members 14 along the first or lower surface 10*a* of the first bar member 10 is 12.25 inches. Angle $\alpha$ may vary between 10° and 90°; is preferably between 10° and 60°; and, is most preferably 40°. Angle $\beta$ may vary between 102° and 140°; is preferably between 110° and 135°; and, most preferably 116°. The distance between the first or lower surface 10*a* of first bar member 10 and the upper or third surface 12a of the second bar member is most preferably 2.25 inches, but may be within a range from approximately 1.8 inches to approximately 4.05 inches.

It will be appreciated by those skilled in the art and others that various modifications and variations may be made to the preferred embodiment and still be within the scope of this invention. For example, the dimensions of opening 15 may be changed to accommodate boards of various cross-sectional dimensions (e.g., 4×4's); also, the span of the first surface 10a between the inner surface 14a of the leg members 14 can be designed to accommodate the conventionally identified thickness of the board 18 and the spacing between the first and third surfaces 10a and 12a can be designed to accommodate the conventionally identified width of the board 18.

The embodiments of the invention in which an exclusive property or privilege is claimed are defined as follows:

1. A support for bracing one end of a horizontally-extending board used for creating a horse, said board having a width and a thickness, said support comprising:

two spaced-apart, elongate, outwardly symmetrical leg members, each leg member having a top and bottom, the leg members arranged so as to form a plane wherein said leg members diverge away from each other from their tops by an angle $\alpha$, wherein said angle $\alpha$ is between 10° and 90°;

a first bar member having first and second substantially planar surfaces and rigidly connected to the tops of said leg members, the span between said leg members at said first surface being greater than the width of said board, said first surface being oriented substantially orthogonal to said plane defined by said leg members and facing said bottom of said leg members, said second surface forming a first edge with said first surface; and a second bar member having third and fourth substantially planar surfaces and rigidly connected to said leg members, said third surface being substantially parallel with, opposed and spaced apart from said first surface, said fourth surface forming a second edge with said third surface, said second edge being spaced substantially from said first edge in a direction transverse to said plane defined by said leg members, said spacing between said first and third surfaces being substantially greater than the thickness of said board and being within a range which allows said first and second edges to contact said board when said board is inserted between said first and third surfaces and forms an obtuse angle $\beta$ with said plane, wherein said angle $\beta$ is between 102° and 140°, said first and second edges being capable of forming indentations in said board when said board is angled from said plane by angle $\beta$ and a downward force is applied to said board.

2. The support claimed in claim 1, wherein;

said top of each leg member is substantially parallel with said first surface, said first surface is welded to said top of each leg member, said second bar member is configured and sized to be welded to mutually opposing sections of said leg members; and said bottom of each leg member is substantially planar and beveled to form an angle $\gamma$ with said plane, wherein said angle $\gamma$ is approximately equal to the supplement of angle $\beta$.

3. The support claimed in claim 2 wherein said leg members and said first and second bar members have a substantially rectangular shape with substantially equal cross-sectional dimensions and are composed of tubular, thin-walled material.

4. A support for bracing one end of a horizontally-extending board for creating a horse, said board having a width and a thickness, said support comprising:

two spaced-apart, elongate, outwardly symmetrical leg members, each leg member having a top and a bottom, the leg members arranged so as to define a plane wherein said leg members diverge away from each other from their tops;

a first cross member joining the tops of said leg members, said first cross member having surfaces defining a pair of parallel edges extending between said leg members and lying in a plane orthogonal to said plane of said leg members, said pair of edges of said first cross member including a first edge, the span of said first cross member between said leg members being greater than the width of said board; and, a second cross member joining said leg members at points between said tops and bottoms thereof, said second cross member having surfaces defining a pair of parallel edges extending between said leg members and lying in a plane orthogonal to said plane of said leg members, said pair of edges of said second cross member including a second edge, said pair of edges of said first cross member being spaced from said pair of edges of said second cross member in a direction transverse to said edges and parallel to said plane defined by said leg members by an amount substantially greater than the thickness of said board, and said second edge also being spaced substantially from said first edge in a direction transverse to said plane defined by said leg members, said first and second edges contacting and forming indentations in said board when said board is inserted between said first and said second cross members and is angled with respect to said plane.

5. The support defined in claim 4 wherein said leg members each have a substantially equal width in a direction transverse to said plane defined by said leg members, and wherein said second edge is spaced from said first edge in said direction transverse to said plane by a distance substantially equal to said width of said legs.

* * * * *